3,408,405
METHOD OF OBTAINING ESSENTIALLY PURE ESTRAGOLE
Albert B. Booth, Jekyll Island, Ga., assignor to Hercules Incorporated, Wilmington, Del., a corporation of Delaware
No Drawing. Filed May 4, 1967, Ser. No. 636,011
3 Claims. (Cl. 260—612)

ABSTRACT OF THE DISCLOSURE

Substantially pure estragole is obtained from estragole-rich feed stocks by crystallization of the estragole.

---

This invention relates to estragole and particularly to the recovery of estragole of high chemical and olfactory purity from volatile products obtained from pine trees.

Estragole, also known as p-allylanisole, chavicol methyl ether, and methyl chavicol has the structural formula

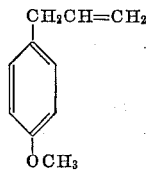

and is a colorless liquid having a characteristic somewhat sassafrassy odor and flavor. Estragole is used in the manufacture of perfumes and flavors. Heretofore, estragole for these uses has been obtained from estragon oil, also known as tarragon oil, whereof estragole is the chief contributor of the oil's odor and flavor.

Estragole is a constituent of turpentine extracted from a living pine tree and is a constituent of volatile products extracted from dead pine stumps by steam distillation, for example.

Estragole is also a constituent of the distillation residues of crude sulfate turpentine. Refined sulfate turpentine and other pinene-containing products are obtained on a large commercial scale by distilling the crude sulfate turpentine evolved during the digestion of southern pine wood by the kraft process in which a cooking liquor containing sodium hydroxide and sodium sulfide is used. The residues from this distillation contain higher boiling terpenes and non-terpenes of potential commercial value, among which is estragole.

Estragole rich (90%–95% by weight) fractions can be obtained economically from any of the above sources by distillation techniques. These fractions will contain also terpene alcohols and terpene ketones, normal constituents of the volatile products of the pine tree, which have boiling points relatively close to that of estragole (216° C.). These terpene alcohols and terpene ketones have a strong pine oil odor and flavor which tend to distort the odor and flavor of estragole. It is exceedingly difficult to remove these undesirable odor and flavor imparting impurities from estragole rich fractions by rectification techniques.

This invention is directed to a novel method of preparing an essentially pure estragole fraction from pine sources, which fraction is substantially free of odor and flavor distorting impurities.

Broadly, in accordance with this invention, an estragole-rich feed stock is cooled below about −21.5° C. whereby crystallization of a substantial proportion of estragole results, forming a two-phase mixture comprised of an estragole crystal phase and a liquid phase. The estragole crystals are separated from the liquid phase and optionally washed to remove any adhering liquid phase.

The estragole-rich feed stocks used in this invention are obtained from the volatile portions of pine extracts as above described. The estragole-rich feed stock will be comprised of, by weight, from about 80% to about 95% estragole and preferably from about 90% to about 95% estragole.

In carrying out this invention the estragole-rich reed stock is cooled to a temperature of below about −21.5° C. and preferably to a temperature of at least about −25° C. and not lower than about −80° C. It has been determined that cooling the feed stock to a temperature within the range of about −25° C. to about −50° C. is highly satisfactory for the purposes of this invention. Slow cooling is helpful in the formation of a crystal phase comprised of coarse crystals, which crystals are easier to separate from the liquid phase than fine crystals. Seeding the cooled feed stock by addition of estragole crystals will substantially increase the rate of crystal formation.

A slush-like composition is formed after crystal formation. If the slush-like composition should present a handling problem, the estragole-rich feed stock can be diluted prior to cooling with a nonreactive liquid diluent, whereby a thinner slush is formed. Examples of suitable diluents include ketones such as acetone; hydrocarbons such as hexane, heptane, and toluene; and the lower alcohols such as methanol, ethanol, propanol, isopropanol and butanol. Mixtures of two or more diluents can be used if desired. The amount of diluent added is not critical and is within the skill of those versed in the art. Large amounts of diluent can be used but this results in substantially greater cooling requirements for operation of the process.

Separation of the liquid phase from the estragole crystals can be accomplished by any convenient means such as by centrifugation, filtration and decantation. The separated estragole crystals have, adhering to their surface, a layer of the liquid phase from which they were separated. This liquid phase layer contains impurities present in the original feed stock. To remove this adhering liquid and thus to improve further the purity of the estragole, the separated estragole crystals can be washed with a cold liquid. The liquid used to wash the crystals, if one is used, should be maintained at a temperature of from about −25° C. to about −50° C. to avoid excessive melting or dissolution of the estragole crystals during washing. Suitable liquids include ethanol, hexane, acetone, toluene, and mixtures thereof.

Another suitable method for removing undesired adhering liquid from the surface of estragole crystals is to allow the estragole crystals to slowly melt, the melted estragole acting as the wash liquid. If this method is employed, the separation process (centrifugation, decantation, filtration) is continued at recurring time intervals or preferably continuously to remove melted estragole which carries with it impure adherent liquid phase.

The degree of purity of the estragole obtained in practicing the method of this invention will depend on the thoroughness of the separation of the liquid phase from the estragole crystals. Purity of estragole obtained using this process will range from about 97% to about 99.9+% by weight estragole.

The liquid phase that is separated from the crystallized estragole, including liquid phase containing a diluent or a wash liquid, can be rechilled to obtain additional estragole crystals until the level of impurities becomes so high that operation of the process is not commercially feasible. This point is readily determined by chilling a portion of the spent liquid phase until crystals form, separating, and optionally washing the crystals, and analyzing them for degree of purity of the estragole obtained.

The following examples are illustrative of this invention. Parts and percentages are by weight unless otherwise specified.

Example 1

Estragole-rich feed stock, 460 grams, is obtained from sulfate turpentine. The feed stock contains 94% estragole and 922 p.p.m. sulfur. The estragole feed stock is cooled slowly to −30° C. with seeding and gentle agitation and maintained at this temperature for 30 minutes to provide a composition comprised of estragole crystals (crystal phase) and a liquid phase. The estragole crystals are separated from the liquid phase by centrifugation. The separated liquid phase weights 167.9 grams. The estragole crystals are allowed to melt slowly and various fractions of the melted crystals are collected. The melted estragole carries with it a substantial amount of impurities originally present on the surfaces of the crystals. The melted crystals are collected in fractions and the melting point of these fractions is determined to the nearest 0.5° C. The percentage estragole in the fraction is determined by gas chromatography and p.p.m. sulfur is determined on alternate samples by X-ray fluorescence. Estragole fractions of high purity measuring from 95.7% to 99.9+% are obtained as shown in Table I. Fractions 3 through 7 have no trace of pine odor or pine oil flavor and are suitable as a highest quality flavor chemical.

TABLE I

| Fraction | Parts | Melting Point, ° C. | Percent Estragole | Sulfur, p.p.m. |
|---|---|---|---|---|
| 1 | 53.2 | −23 | 95.7 | |
| 2 | 46.6 | −22.5 | 98.7 | 498 |
| 3 | 39.4 | −21.5 | 99.3 | |
| 4 | 54.1 | −21.5 | 99.6 | 59 |
| 5 | 43.3 | −21.5 | 99.6 | |
| 6 | 46.2 | −21.5 | 99.9 | 3 |
| 7 | 6.8 | | | (¹) |

¹ No detectable impurity.

Example 2

Example 1 is repeated with the exception that the separated crystals are washed with ethanol, the ethanol being at a temperature of about −30° C. The estragole will have a purity of about 99.6%.

It is to be understood that the above description and examples are illustrative of this invention and not in limitation thereof.

What I claim and desire to protect by Letters Patent is:

1. A method which comprises cooling an estragole-rich feed stock containing, by weight, from about 90% to about 95% estragole obtained from the volatile portions of pine extracts to a temperature below about −21.5° C. to provide an estragole crystal phase and a liquid phase and subsequently separating the estragole crystal phase and the liquid phase, said crystal phase, upon melting, providing an estragole fraction of high purity.

2. The method of claim 1 wherein the feed stock is cooled to a temperature of from about −25° C. to about −50° C.

3. The method of claim 1 wherein adhering liquid is substantially all removed from the estragole crystals after separation from the liquid phase.

References Cited

UNITED STATES PATENTS 1,928,020   9/1933   Humphrey _____ 260—612 XR

OTHER REFERENCES

Wagner, Manufacturing Chemist, vol. 22, pp. 271–272, 288 (1951).

BERNARD HELFIN, *Primary Examiner.*